Patented Aug. 27, 1929.

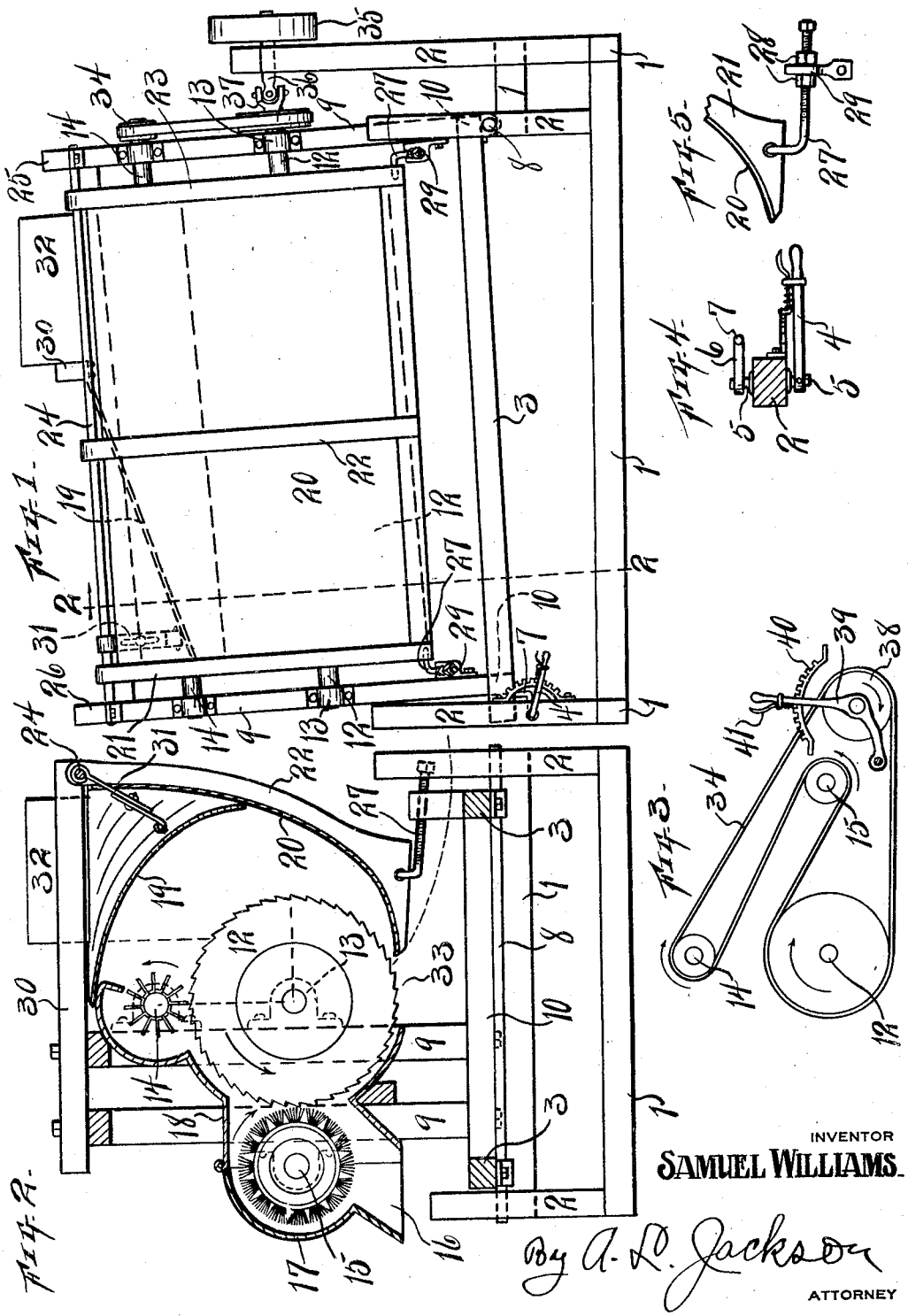

1,726,203

UNITED STATES PATENT OFFICE.

SAMUEL WILLIAMS, OF ELK CITY, OKLAHOMA.

MACHINE FOR EXTRACTING HULLS OF COTTON BOLLS FROM SEED COTTON.

Application filed August 17, 1928. Serial No. 300,302.

My invention relates to machines for extracting hulls of cotton bolls from seed cotton and more particularly to machines for removing hulls from cotton by means of inclined cylinders or drums provided with hull extracting means; and the object is to provide simple means for continuous treatment of the mass of seed cotton and hulls until all the cotton has been extracted from the hulls and the hulls discharged from the machine. One of the advantages of the machine is that it is simple in construction and easily operated and the treatment of the cotton and hulls is continuous and the mass is repeatedly subjected to the treatment, the mass growing gradually less, until all the cotton is separated from the hulls and the cotton and hulls discharged from the machine at different points. Another advantage is that the mass of cotton and hulls is fed to the cleaning elements by gravity. The machine has been subjected to service conditions and it has been demonstrated to be highly efficient. This machine is devised to meet the changed conditions of harvesting cotton. Heretofore cotton has been separated from bolls by the fingers of workmen. This custom is being rapidly discarded and the hulls or complete bolls are pulled. The improved machine is designed to separate the hulls and stems from the seed cotton. One advantage of the improved machine is the adjustability of important working parts. The inclination of the cylinders or drums and brush drums afford means for treating a mass of hulls and seed cotton commencing at the first turn of the picker drum and then shifting the reduced mass to a lower part of the picker drum on each turn so that whatever cotton may be still left in the hulls will be separated in subsequent turns of the picker drum and cooperating parts. The smaller portions of the hulls and other trash commence falling through a slot in the bottom of the machine as soon as the separation of the cotton from the hulls commences and continues all the way to the end of the drums and then all the hulls separated from the cotton fall out of the machine at the end. Other objects and advantages will be fully explained in the following description and the invention will be more particularly pointed out in the claims.

Reference is had to the accompanying drawings which form a part of this application.

Fig. 1 is a rear elevation of the machine.

Fig. 2 is a vertical section, taken on the line 2—2 of Fig. 1.

Fig. 3 is a diagrammatic view of the drive of the working parts.

Fig. 4 is a detail view of the means for adjusting the inclination of the inner working frame and parts carried thereby.

Fig. 5 is a detail view of the means for adjusting the rear casing for, varying the size of the roll box and for controlling the material which escapes from the machine.

Similar characters of reference are used to indicate the same parts throughout the several views.

The machine is provided with a base frame consisting of base members 1 and uprights 2. The main operating frame of the machine is mounted on the base frame.

The working frame has inclined supporting beams 3. At one end of the machine, the beams 3 are pivotally connected to the uprights 2 and at the other ends, the beams 3 are adjustable vertically by means of a lever 4 which is attached to a fulcrum 5 which is mounted in the upright 2. This fulcrum has an arm 6 and an upstanding lifting member 7. The fulcrum rod 5 extends to the front of the machine and is provided with duplicate arms 6 and lifting member 7. The entire inner frame and casing in the frame may be adjusted vertically with the levers 4. The beams 3 are pivotally connected to one end of the machine by a pivot shaft 8. Bearing uprights 9 are mounted on and attached to supporting beams 10 which are adjustable along with the adjustment of the beams 3. A picker roller 12 is journaled in bearings 13 which are attached to one pair of the uprights 9. A doffing roller or brush 14 is journaled in bearings which are attached to two uprights 9. The doffing roller or brush 14 brushes the hulls backwardly and prevents the hulls from going forward with the cotton.

A brush or doffing roller 15 is journaled in bearings which are attached to pair of uprights 9. The brush cylinder 15 removes the cotton from the picker roller 12 and drives it out through the chute 16. A hood 17 is pivotally connected to the stationary casing 18 and forms a part of the casing and also a part of the discharge spout 16.

An important feature of this invention is the adjustable inclined roll box formed adjacent to the picker roller 12, doffing roller 14, and two adjustable casing members 19 and 20. The casing member 20 is attached to three arms 21, 22, and 23 which are pivotally connected to rockershaft 24 which is journaled in the uprights 25 and 26. The member 20 is adjustable by brackets 27. These brackets are attached to the arms 21 and 23 and have their outer ends threaded and made adjustable by nuts 28 and supported in brackets 29 which are attached to frame members 9. By means of the brackets 27, the casing member 20 can be adjusted closer to or further from the picker roller 12 for obtaining the proper space between the picker roller 12 and the casing 20 to allow the hulls, stems, and trash to drop out of the machine through the open bottom without allowing the cotton to fall out. This adjustment is necessary for the different sizes of cotton boll hulls, and different lengths of cotton staple. The casing member 19 is attached to a cross bar 30 at its upper end and suspended by expansible rods 31 substantially at the middle of the lower end. The casing member 19 is thus made adjustable and bears against the stationary casing member 18 and the adjustable member 20. The casing members 19 and 20 cooperate to continue to form a roll of the material being operated upon notwithstanding the fact that cotton and hulls have been extracted from the roll and it is becoming smaller. A hopper or feeding chute 32 is provided at the upper side of the machine for feeding the mass of cotton and hulls into the roll box at one side of the machine. The material is worked down towards the other side by reason of the inclined cylinders 12, 14, and 15. The inclination of the picker roller and doffing roller aided by gravity causes the unseparated hulls and cotton to move towards the lower ends of the cylinders. All during the passage of the mass of hulls and cotton towards the lower end, the separated hulls are constantly falling through the wide slot 33 and the separated cotton is passing through the discharge chute 16. The shaft 12 may be driven by any suitable power. The drawings show a belt 34 for driving all three cylinders. The shaft 12 is driven by a power pulley 35 which is provided with a shaft 36 which is connected to the shaft 12 by a universal coupling 37. Means are provided for controlling the tension of the belt 34. An idler 38 is provided and a lever 39 is provided with a suitable fulcrum and the lever carries the idler. A rack 40 is provided for holding the idler at different adjustments and the lever is provided with a dog 41 for holding the lever at different adjustments.

What I claim, is—

1. A machine for extracting cotton boll hulls from seed cotton comprising a frame, a casing mounted at an angle in said frame and adapted to swing within said frame, a picker roller journaled in said casing for acting on the mass of seed cotton and hulls, a huller roller journaled in said casing parallel to said picker roller and provided with beaters for removing hulls from said picker roller and from the seed cotton, means for feeding a mass of seed cotton and hulls to the elevated end of said picker roller, and means for adjusting said swinging casing to increase or decrease the inclinations of said rollers.

2. A machine for extracting cotton boll hulls from seed cotton comprising a frame, a casing adapted to swing within said frame, a picker roller provided with a shaft journaled in said casing at an angle to the members of said frame, a doffing roller journaled in said casing parallel to said picker roller for preventing hulls from passing forward with the seed cotton, a roller for removing seed cotton from said picker roller, means for feeding a mass of cotton and hulls to the elevated end of said picker roller, said picker roller and doffing roller being aided by gravity serve to shift the unseparated hulls and seed cotton towards the lower end of said rollers and casing, and means for adjusting said swinging casing and holding the same at different adjustments.

3. A machine for extracting cotton boll hulls from seed cotton comprising a frame, a casing adapted to swing within said frame, a picker roller journaled in said casing, a doffing roller journaled in said casing for preventing hulls from passing forward with seed cotton, means for removing cotton from said picker roller, said casing having adjustable members adjacent to said picker and doffing rollers, and said rollers and adjustable casing members serving to form a roll box and to form a roll in said box to be acted upon by said picker roller.

4. A machine for extracting cotton boll hulls from seed cotton comprising a frame, a casing adapted to swing within said frame, picker and doffing rollers journaled in said casing, means for removing cotton from said picker roller, said casing having upper and lower adjustable members cooperating with said rollers to form a roll box, and said lower casing member forming a converging space between it and said picker roller to take care of the diminishing roll formed in said roll box.

5. A machine for extracting cotton boll hulls from seed cotton comprising a frame, a casing adapted to swing within said frame, picker and doffing rollers journaled in said casing at an angle to the members of said frame, means for removing cotton from said picker roller, said casing having upper and lower adjustable members cooperating with said rollers to form a roll box, said adjustable casing members forming a converging space between the same and said picker roller to take care of the diminishing roll formed in said roll box.

6. A machine for extracting cotton boll hulls from seed cotton comprising a frame, a casing adapted to swing within said frame, picker and doffing rollers journaled in said casing at an angle to the members of said frame, means for removing cotton from said picker roller, said casing having adjustable members cooperating with said rollers to form a roll box, said adjustable casing members forming a converging space between the same and said picker roller to take care of the diminishing roll formed in said roll box, and said casing having a longitudinal opening at the termination of said adjustable casing for discharge of hulls.

7. A machine for extracting cotton boll hulls from seed cotton comprising a frame, a casing adapted to swing within said frame and normally at an angle to the members of said frame, picker and doffing rollers journaled in said casing at an angle to the members of said frame, means for feeding a mass of seed cotton and hulls to the upper end of said picker roller, said casing having adjustable members cooperating with said rollers to form a roll box and to form a roll within said box which diminishes from the upper to the lower end by reason of constant removal of cotton and hulls, and said adjustable casing members forming a converging space to take care of the diminishing roll formed in said roll box.

8. A machine for extracting cotton boll hulls from seed cotton comprising a horizontal frame, a casing adapted to swing within said frame, and set at an angle to said frame and having an opening in the lower end thereof and a longitudinal opening in the lower side thereof, means for feeding a mass of seed cotton and hulls to the upper end of said casing, means for forming a roll box and a roll therein, means for constantly removing cotton and hulls from said roll and shifting the diminishing roll towards the lower end of said casing and simultaneously discharging hulls through said longitudinal opening and finally discharging the remaining hulls through said end opening.

9. A machine for extracting cotton boll hulls from seed cotton comprising a horizontal frame, a casing adapted to swing within said frame and set at an incline in said casing, picker and doffing rollers journaled in said casing, means for feeding cotton to the upper end of said picker roller, means for removing cotton from said picker roller, said casing having upper and lower adjustable members cooperating with said rollers to form a roll box and a roll within said box and forming a converging space between the casing members and said picker roller, means for adjusting said upper casing member towards and from said picker roller, means for adjusting said lower casing member towards and from said picker roller, said casing having an opening in the end and a longitudinal opening at the termination of said lower casing for discharge of hulls and trash.

In testimony whereof, I set my hand, this 14th day of August, 1929.

SAMUEL WILLIAMS.